United States Patent [19]

Hascher-Reichl et al.

[11] Patent Number: 4,890,815
[45] Date of Patent: Jan. 2, 1990

[54] VALVE WITH MEMBRANE SPRING

[75] Inventors: Asta Hascher-Reichl, Stuttgart; Hans Kubach, Korntal-Münchingen, both of Fed. Rep. of Germany

[73] Assignee: Robert Bosch GmbH, Stuttgart, Fed. Rep. of Germany

[21] Appl. No.: 769,786

[22] Filed: Aug. 23, 1985

Related U.S. Application Data

[63] Continuation of Ser. No. 540,610, Oct. 7, 1983, abandoned.

[30] Foreign Application Priority Data

Oct. 9, 1982 [DE] Fed. Rep. of Germany ....... 3237532

[51] Int. Cl.⁴ .............................................. F16K 31/02
[52] U.S. Cl. ........................... 251/129.15; 251/129.21; 251/65
[58] Field of Search ...................... 251/129.01, 129.02, 251/129.15, 129.16, 129.17, 129.21, 65; 335/229, 230, 234, 236

[56] References Cited

U.S. PATENT DOCUMENTS

| 2,289,563 | 7/1942 | Wood et al. ...................... 137/598 X |
| 2,972,465 | 2/1961 | Ray ................................... 251/65 X |
| 3,069,602 | 12/1962 | Stout et al. ............................ 335/229 |
| 3,071,714 | 1/1963 | Hadekel ........................... 335/234 X |
| 3,361,161 | 1/1968 | Schwartz ........................... 251/65 X |
| 3,379,214 | 4/1968 | Weinberg ........................... 251/65 X |
| 3,432,782 | 3/1969 | Ellenberger ..................... 335/229 X |
| 3,521,854 | 7/1970 | Leiber et al. .................... 251/141 X |
| 3,921,670 | 11/1975 | Clippard et al. ................. 251/129.01 |
| 4,056,255 | 11/1977 | Lace ................................ 251/129.01 |
| 4,281,685 | 8/1981 | Uemura ................................ 251/65 |
| 4,310,143 | 1/1982 | Determan ......................... 251/65 X |
| 4,336,823 | 6/1982 | Staiger et al. ...................... 251/129 |

FOREIGN PATENT DOCUMENTS 2507332 9/1976 Fed. Rep. of Germany .......................... 251/129.16
852714 10/1960 United Kingdom ................ 335/229

Primary Examiner—Noah P. Kamen
Attorney, Agent, or Firm—Michael J. Striker

[57] ABSTRACT

A magnetic valve has a coil, an armature, and a permanent magnet arranged coaxially with the coil, wherein the permanent magnet is formed as a plate with magnetic lines of force extending in the same direction or oppositely to the magnetic lines of force of the coil, and the armature is formed as a valve body opening in direction toward a lower pressure.

6 Claims, 2 Drawing Sheets

VALVE WITH MEMBRANE SPRING

This application is a continuation of application Ser. No. 540,610 filed Oct. 7, 1983, now abandoned.

BACKGROUND OF THE INVENTION

The present invention relates to a magnetic valve. More particularly, it relates to a magnetic valve which has a coil, an armature, and a permanent magnet arranged coaxially with the coil.

Magnetic valves of the above mentioned types formed as pressure valves with the coil and the coaxial permanent magnet are known. The known magnetic valves have the disadvantage that in the event of impacting the valve during turning off the stream voltages are generated which are based on an undesirable residual magnetism. Conventional pressure valves of known construction require for opening a very high spring force which must lie above the hydraulic pressure.

SUMMARY OF THE INVENTION

Accordingly, it is an object of the present invention to provide a magnetic valve which avoids the disadvantages of the prior art.

With this object and others which will become apparent hereinafter, one feature of the present invention resides, briefly stated, in a magnetic valve having a coil, an armature and a permanent magnet coaxial with the coil, wherein the permanent magnet is formed as a plate and the magnetic lines of force of the permanent magnet extend in a direction coinciding with or opposite to the direction of the magnetic lines of force of the coil, and the armature is formed as a valve body which opens in direction toward a lower pressure.

When the magnetic valve is designed in accordance with the present invention, it is advantageous as compared with the magnetic valves of the known construction. The valve is formed as a valve openable toward the lower pressure and provided with an armature which can be mounted as a unit. All valve parts can be mounted from the front. Because of the low movable masses, a high switching speed with low vibrations is attained. During bringing the narrow parts in the soft iron circuit in expensive permanent magnets can be used. With the aid of the narrow parts, the eddy current loss in the permanent flux circuit can be suppressed. This effect is increased when, in accordance with another feature of the present invention, an outer depression is provided. When a force F= zero, the magnetic flux changes its polarity. Thus a magnetic power flux reaches the armature, it extends sharply and exactly through zero, whereby an accurately defined dropout time takes place. By the reduction of the stream after the dropout of the armature, both the closing dead time of the valve is reduced and the electric power connected therewith is spared. With the utilization of a permanent magnet formed as a disk in accordance with a further feature of the present invention, there is provided a concentration of the magnetic power flux lines extending in the soft iron region between the magnetic coil.

The combination of the coil with the permanent magnet provides for a safety arrangement. In the event of failure of the current, the valve body remains in a constant position because of the constant magnetic flux of the permanent magnet.

The novel features which are considered characteristic for the invention ar set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
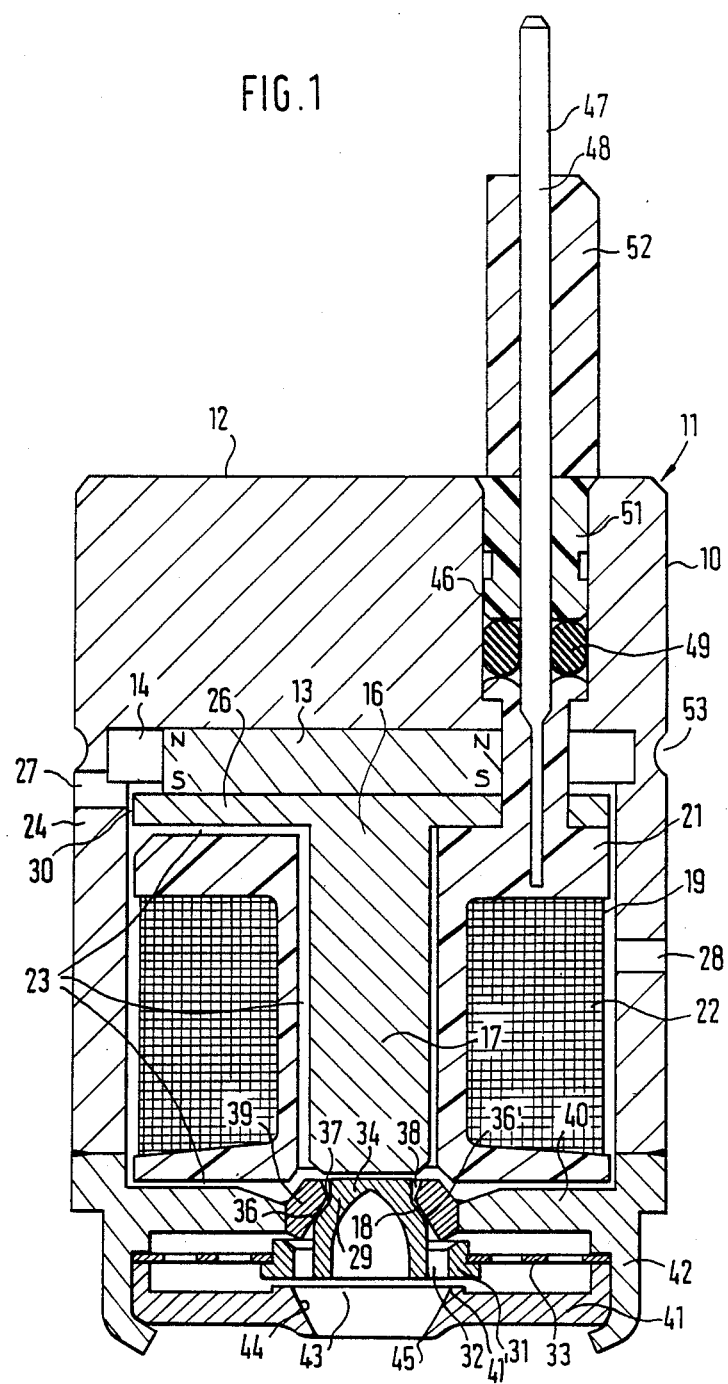
FIG. 1 is a view showing a longitudinal section of a magnetic valve in accordance with the present invention.
Figure 2:
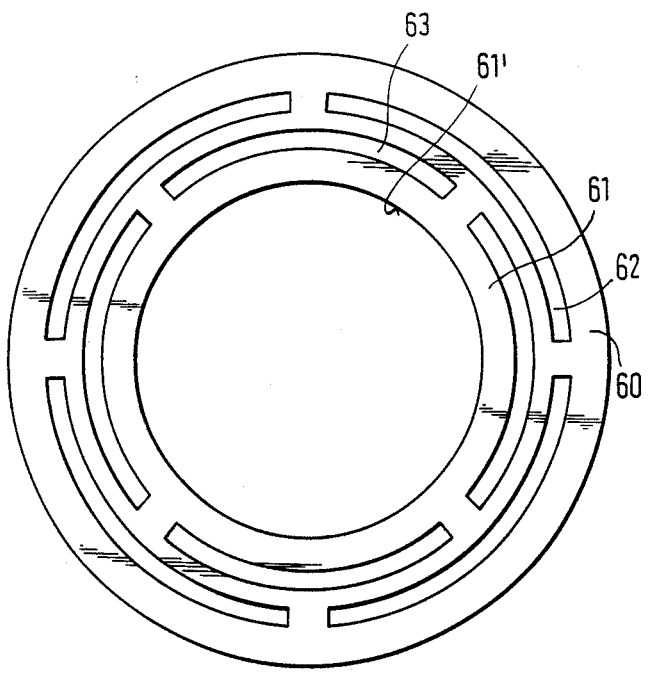
FIG. 2 is a plan view of a membrane spring of the inventive magnetic valve.

A magnetic valve in accordance with the present invention is identified as a whole with reference numeral 11 and has a housing 10. The housing 10 is cup-shaped and has a fixed bottom 12 composed of soft iron. A disk formed as a permanent magnet 13 is located under the bottom 12. Its axis of symmetry coincides with the axis of the magnetic valve 11. The position of the permanent magnet 13 is selected so that either its north pole or its south pole abuts against the bottom 12, but not both poles together.

An annular groove 14 is formed in the housing 10 and extends around the transverse axis of the permanent magnet 13. A T-shaped soft iron part 16 is arranged under the permanent magnet 13. An elongated leg portion 17 of the soft iron part 16 extends to an outlet opening 18. A coil former 21 is located in an intermediate chamber 19 between the elongated portion 17 and the housing 10 and has a U-shaped cross section. Convolutions of a coil 22 are arranged in the coil former 21. The opening of the U-shaped coil former 21 faces toward the housing 10. A small annular gap 23 is formed around the coil former 21.

The soft iron part 16 has a transverse web 26. An inlet opening 27 is formed in a wall 24 of the housing 10 at the height of the transverse web 26 of the soft iron part 16. A further inlet opening 28 is arranged at the opposite side of the housing at the height of the coil 22. An annular gap 30 is formed between the transverse web 26 of the soft iron part 16 and the wall 24 of the housing 10.

A valve body 29 formed as an armature is located in the outlet opening 18. The valve body 29 has a shape of an inverted V, is hollow and downwardly open. The valve body 29 has a flange-like edge 31 and is provided with a slot 32 or longitudinal openings at this edge. The valve body 29 is supported at its edge 31 in a membrane spring 33. The valve body 29 lies with its upper part 34 in the downwardly increasing outlet opening 18 which simultaneously forms a valve seat 36. The valve seat 36 as well as the outlet opening 18 are formed in a ring-shaped body 39. A curve 37 is formed above the valve seat 36 on the valve body 29, such that an axially extending annular gap 38 is formed between the outlet opening 18 and the valve body 29. It serves as a mixing zone for the pressure medium. The body 39 is connected with an inwardly extending edge 40 of the housing 10.

The housing 10 has at its end facing away from the bottom 12 a ring-shaped edge 42 which is flanged at its lower side and thereby holds a disk 41 which in turn holds the membrane spring 33. The disk 41 has a central passage 43 with an inwardly and downwardly extending conical impact surface 44. The impact surface 44 is located directly under the slot 32 and serves for atomization of the pressure medium. A dropping-off edge 45 is formed at the end of the passage 43 and prevents formation of drops. A ring-shaped edge 41' is formed on the disk 41 for impact damping of the membrane spring 33.

A longitudinal opening 46 is arranged in the bottom 12 and offset to its one outer side. A pipe 47 of a feeding device 48 for the coil 22 is located in the longitudinal opening 46. The longitudinal opening 46 is filled around the pipe 47 and to above the permanent magnet 13 with the same material as the coil former 21. An O-ring 49 is located above the coil former 21. Above the O-ring 49 a plastic insert 51 and a plastic extruded part 52 are arranged. They tightly close the longitudinal opening 46 from above. A depression 53 is formed in the outer wall of the housing at the height of the permanent magnet 13 and extends around the housing. The depression 53 increases the effect of suppression of eddy current loss in the permanent flux circuit.

The membrane spring 33 is formed so that between its outer peripheral portion 60 and its inner peripheral portion 61 four slots 62 and 63 are formed on two diameters. The slots 62 are offset relative to the slots 63 by 45°. The valve body 29 is inserted into the passage 61' of the membrane spring 33. The membrane spring 33 serves as an elastic element. It holds the valve body 29 in a constant position and compensates vibrations, so that also in an inclined position of the valve body 29 the magnetic valve 11 is sealed.

The operation of the magnetic valve in accordance with the present invention is as follows:

A separate magnetic power flux acts through the coil 22 and through the permanent magnet 13. A magnetic power flux generated by the permanent magnet extends around the annular groove 14 from the north pole to the south pole. The course of lines of force is here over the gap 30 and the transverse webs 26. The gap 30 serves as a leakage gap for reducing eddy current losses.

A further power flux generated by the permanent magnet 13 extends in the same direction, surrounds the coil former 21 and extends over the edge 31, the valve seat 36, the valve body 29 and the elongated portion 17 of the soft iron part 16.

The lines of forces of the coil 22 extend analogously but in an opposite direction. The smaller power flux circle extends around the coil former 21 and over the edge 40, the valve seat 36 and the valve body 29. The greater power flux circle encloses the region around the annular groove 14.

The total magnetic flux of the coil 22 and the permanent magnet 13 is obtained as a sum of both individual differently great power fluxes. The total power flux of the magnetic valve 11, which acts on the valve body 29, is a difference between the total power flux of the coil 22 and the permanent magnet 13. By this total power flux, the valve body 29 is controllable and an arbitrary opening value is adjustable. By the adjustable opening value, the pressure medium quantity can for example be dosed. The pressure medium flows via the inlet openings 27 and 28 into the magnetic valve 11, and thereby rinses the coil 22. As a result of this, the coil 22 is cooled and at the same time the pressure medium is heated.

The magnetic valve in accordance with the present invention is advantageously used as a valve for dosing a fuel, for example in Otto or Diesel engines. Here the fuel must be additionally prepared. The fuel runs unthrottled through the slots 32 in the valve body 29. During impacting against the impact surface 44 the fuel is finely atomized. The dropping-off edge 45 prevents formation of drops of the atomized fuel. The gap 38 between the upper part of the valve body 29 and the ring-shaped body 39 forms a dosing zone which is substantially independent of the stroke of the valve body 29.

The combination of the coil 22 and the permanent magnet 13 serves as a safety arrangement. In the event of power failure, the operation of the coil 22 completely stops. The magnetic force of the permanent magnet 13 acts, however, as before with a constant force and holds the valve body 29 in a constant position. By selection of the direction of the polarity of the permanent magnet 13, the magnetic valve 11 can be closed or held in a constantly open position. The valve body 29 therefore cannot move to and fro under the action of the current and thereby an arbitrarily changing throughflow quantity cannot take place.

The use of a simple and inexpensive permanent magnet 13 provides that the loss by the eddy current and thereby heating can be reduced by the annular groove 14.

It will be understood that each of the elements described above, or two or more together, may also find a useful application in other types of constructions differing from the types described above.

While the invention has been illustrated and described as embodied in a valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A magnetic valve for controlling a flow of liquid, comprising a coil having an axis; an armature; a permanent magnet arranged coaxially with said coil and so that its poles are spaced from one another in an axial direction of said coil, said permanent magnet being formed as a plate, and said armature being formed as a valve body opening in a flow direction so that its opening force is provided by the liquid flow and its closing force is provided by a force of said permanent magnet; a disc-shaped membrane spring, said membrane spring having a central opening in which said valve body is supported, and also having an inner side mounted on said valve body, so that said valve body is supported only by said membrane spring, and said membrane spring does not apply any opening or closing force to said valve body; and a housing having a wall and arranged so that an intermediate space for controlling the magnetix flux is formed between said permanent magnet and said wall of said housing.

2. A magnetic valve as defined in claim 1, wherein said coil has magnetic lines of force extending in a predetermined direction, said permanent magnet being arranged so that its magnetic lines of force extend in a direction which is opposite to the direction of extension of the magnetic lines of force of said coil.

3. A magnetic valve as defined in claim 1, wherein said coil has magnetic lines of force extending in a predetermined direction, said permanent magnet being arranged so that its magnetic lines of force extend in the direction in which the magnetic lines of force of said coil extend.

4. A magnetic valve as defined in claim 1; and further comprising a housing having a wall, a coil former, and a small web provided between said coil former and said permanent magnet and forming a magnetic leakage gap between said web and said wall of said housing.

5. A magnetic valve as defined in claim 1; and further comprising a housing having an outer side, said permanent magnet being arranged in said housing at a predetermined height, said housing having a depression extending around said housing at its outer side at the height of said permanent magnet.

6. A magnetic valve as defined in claim 1; and further comprising a housing formed of soft iron.

* * * * *